UNITED STATES PATENT OFFICE.

BENNO HOMOLKA, OF FRANKFORT-ON-THE-MAIN, GERMANY, ASSIGNOR TO FARBWERKE, VORM. MEISTER LUCIUS & BRÜNING, OF HÖCHST-ON-THE-MAIN, GERMANY, A CORPORATION OF GERMANY.

BLUE QUINOLIN DYE AND PROCESS OF MAKING THE SAME.

No. 844,804.    Specification of Letters Patent.    Patented Feb. 19, 1907.

Application filed June 1, 1906. Serial No. 319,668. (Specimens.)

*To all whom it may concern:*

Be it known that I, BENNO HOMOLKA, Ph. D., chemist, a citizen of the Empire of Germany, residing at Frankfort-on-the-Main, Germany, have invented certain and useful Improvements in the Process of Making Blue Quinolin Dyes and Process of Making the Same, of which the following is a specification.

By the action of alkalies on the salts of certain alkylammonium bases of the quinolin series Spalteholz obtained red dyestuffs (*Berichte d. D. Chem. Ges.*, XVI, 1851) which were further examined by Hoogewerff and Von Dorp and called "isocyanines," (*Recueil des Travaux Chimiques des Pays Bas* III, 346.) Miethe and Book have cleared up the constitution of these dyestuffs, (*Ber. d. D. Chem. Ges.*, XXXVII, 2008,) while finally a series of homologues and substituted isocyanins became known by the United States Patent No. 805,143.

I have found that the salts of such alkylammonium bases of the series of quinolins, or the salts of mixtures of such bases which by the action of alkalies yield isocyanins, may yield under other conditions blue dyestuffs—namely, if these salts be treated with alkalies in presence of formaldehyde. If, for instance, alkali be allowed to act on the alcoholic solution of a mixture of quinaldin-etho-iodid and quinolin-etho-iodid, a red dyestuff may be obtained which Hoogewerff and Von Dorp (*loc. cit.*) have called "diethyliso-cyanin;" but if to the alcoholic solution of the same mixture of quinolin-etho-iodid and quinaldin-etho-iodid be first added formaldehyde and finally alkali, or the formaldehyde simultaneously with the alkali, then no longer the red diethylisocyanin, but a new beatifully blue dyestuff is obtained. I call these new dyestuffs "cyanols," and have ascertained that each "isocyanin" corresponds with a "cyanol." (Compare E. Valenta, *Photogr. Correspondenz*, XLIII Band, 3 Heft, 1906, p. 132.)

It is immaterial what salts of the alkyl-quinolinium and alkyl-quinaldinium bases are employed in the process just described. The same result may be obtained by using the halids or sulfates, nitrates, &c., or even the salts of organic carbonic acids and sulfonic acids. It is neither necessary to use readily prepared formaldehyde, as substances may be used which produce formaldehyde or are capable of eliminating formaldehyde—as, for instance, methylal, anhydroformaldehyde-anilin, &c. For the alkali may be used with the same result the alkali hydroxids, alkaline-earth hydroxids, and also certain salts of alkaline reaction—such, for instance, as the alkali sulfits. In the same manner different solvents may be used in the manufacture of these new dyestuffs, like water, ethyl alcohol, methyl alcohol, pyridin, &c.

The new dyestuffs are not suitable for coloristic purposes, as they are not fast to light; but they are particularly suitable for the manufacture of panchromatic photographic plates, being the best photographic sensitizers now existing. (Compare A. v. Hübel, *Photograph. Correspondenz*, XLIII Band, 4 Heft, 1906, p. 165.)

*Example I—Dyestuff from quinolin-etho-iodid and quinaldin-etho-iodid obtained in alcoholic solution.*—Thirty parts, by weight, of quinolin-etho-iodid and thirty parts of quinaldin-etho-iodid are dissolved in boiling alcohol. To the hot solution is added a freshly-prepared mixture of thirty parts, by weight, of caustic-soda lye of sixteen-per-cent. strengths and twenty parts, by weight, of formaldehyde of forty-per-cent. strength. The liquid becomes of a deep blue within a few minutes. Heating is continued on the water-bath for about one-half hour, whereupon it is allowed to cool, when the dyestuff separates as beautiful crystals of a green metallic luster. These are filtered off, washed with icy-cold alcohol, and recrystallized from boiling wood-spirit. The dyestuff thus obtained is soluble in alcohol, wood-spirit, and pyridin with a deep-blue color. In water it is soluble with difficulty, the color of the aqueous solution being of a decided redder hue than that of the alcoholic solution. The aqueous and alcoholic solutions are not decolorized by carbonic acid; but an excess of acetic acid produces decolorization. Dilute mineral acids even have to be added in considerable quantities in order to decolorize the solutions.

*Example II—Dyestuff from quinolin-metho-chlorid and meta or para-toluquinaldin-etho-iodid obtained in aqueous solution.*—Twenty-five parts of quinolin-metha-chlorid and thirty parts, by weight, of toluquinaldin-ethoiodid are dissolved together in five hundred parts, by weight, of hot water. To this solution are added eighteen parts, by weight, of formaldehyde of forty-per-cent. strength and then twenty-five parts, by weight, of caustic-soda lye of sixteen-per-cent. strength. The whole is heated for a short time, whereupon the dyestuff separates in form of crusts of metallic luster. These are separated from the aqueous solution and recrystallized from alcohol or wood spirit. The dyestuff is soluble in alcohol, soluble with difficulty in water with a green-blue color, and has the same properties as that above described.

*Example III—Dyestuff from quinaldin-etho-iodid obtained in pyridin solution.*—Thirty parts, by weight, of quinaldin-etho-iodid are dissolved in one hundred and fifty parts, by weight, of hot pyridin. To the hot solution are added ten parts, by weight, of formaldehyde of forty-per-cent. strength and ten to fifteen parts, by weight, of caustic-soda lye of sixteen-per-cent. strength, whereupon the whole is heated to boiling for a few minutes. When cold, the dyestuff separates partly as crystals of metallic luster. It is diluted with about five hundred parts, by weight, of water, the now entirely separated dyestuff is filtered, washed with water, and recrystallized from alcohol or wood-spirit. The dyestuff is soluble in alcohol with a blue color and has the same properties as that described before.

In the above examples may be substituted:

1. For the salts mentioned therein of the alkyl-quinaldinium and alkyl-quinolinium bases the salts of homologous and substituted alkyl-quinaldinium and alkyl-quinolinium bases. The dyestuffs thus obtained are all blue, green-blue to blue-green, and have the same properties as those above described.

2. For the formaldehyde such compounds as readily eliminate formaldehyde or may be easly transformed into formaldehyde, for instance, anhydroformaldehyde-anilin and its homologues, methylal, ethylal and the like. By using these bodies the process is not essentially changed.

3. For the caustic-soda lye the equivalent quantity of caustic potash or other alkali-hydroxids, alkaline earths hydroxids and salts of alkaline reaction, such as alkali sulfites.

Having now described my invention, what I claim is—

1. The herein-described process of making blue basic dyestuffs of the quinolin series, which consists in reacting with certain inorganic compounds of alkaline reaction herein described in presence of formaldehyde on solutions of salts of such alkylammonium bases of the quinolin series as yield isocyanins by the action of alkalies.

2. As new product, the dyestuff obtained by the action of certain inorganic substances of alkaline reaction in presence of formaldehyde on solutions of salts of alkylammonium bases of the quinolin series which by the action of alkalies yield isocyanins, said dyestuff being excessively sensitive to light and insoluble in ether, benzene, toluene, xylene and ligroine, soluble with a blue color in alcohol, methyl alcohol, aceton and chloroform, soluble in water with a violet color; the aqueous solution is decolorized by mineral acids and restored by alkalies and ammonia.

In testimony that I claim the foregoing as my invention I have signed my name in presence of two subscribing witnesses.

BENNO HOMOLKA.

Witnesses:
JEAN GRUND,
CARL GRUND.